United States Patent Office 2,865,723
Patented Dec. 23, 1958

2,865,723
STABILIZED MOTOR FUELS

Gerald R. Lappin and John W. Thompson, Kingsport, Tenn., assignors to Eastman Kodak Company, Rochester, N. Y., a corporation of New Jersey No Drawing. Application August 31, 1953
Serial No. 377,722

5 Claims. (Cl. 44—71)

This invention relates to the stabilization of motor fuels, particularly gasolines, which are subject to deterioration caused by the action of molecular oxygen, containing a catalytically active metal reagent normally effective to catalyze oxidation of said motor fuel.

Many gasolines are subject to rapid deterioration as a result of oxidation through contact with air. This oxidative deterioration is greatly accelerated by the catalytic effects of certain metals and their compounds. Cracked gasoline is particularly subject to metal catalyzed oxidation with resulting gum formation. Thus, a cracked Pennsylvania gasoline containing N-n-butyl-p-aminophenol as an oxidation inhibitor was found to develop only 3.8 mg. of A. S. T. M. gum per 100 cc. during eight months' storage while a sample of the same gasoline containing 1 mg. of copper per liter developed 12.0 mg. of A. S. T. M. gum per 100 cc. after one month of similar storage. Copper and its compounds are among the chief catalytically active metal reagents which catalyze oxidation of gasoline. However, cobalt, manganese, vanadium, iron, chromium and lead and their compounds, for example, also accelerate the rate of oxidation of motor fuels, such as gasoline.

Catalytically active metal reagents may get into gasoline in a number of ways. Thus petroleum hydrocarbons frequently contain some objectionable sulfur compounds, such as mercaptans. It is well known to remove these sulfur compounds or to convert them to less objectionable compounds by appropriate chemical treatment, generally referred to as a sweetening operation. One method of sweetening gasoline involves the use of copper salts. This latter method is widely used for the treatment of petroleum motor fuels, such as gasoline. Frequently in the copper sweetening process various copper compounds are carried over into the treated gasoline where they are very objectionable since even in trace concentrations they catalyze oxidative deterioration of the treated gasoline. Similarly, when gasoline is treated with a doctor solution, lead compounds which catalyze oxidative deterioration of the treated gasoline may be carried over into the treated gasoline.

Additionally, gasoline is invariably exposed to metals, particularly copper and iron, through contact with storage tanks and fuel lines, for example, and may pick up catalytically active metal reagents during such exposure.

In recent years compounds referred to as "oxidation inhibitors" or "antioxidants" have been used to help preserve organic substances, such as gasoline, subject to oxidative deterioration. These agents, which are mostly oxidizable organic compounds, retard the autocatalytic process. While the discovery of "antioxidants" has been of much help since they are themselves oxidized in the course of time, as a result of auto-oxidation, the beneficial effect obtained by their use is not permanent and they protect the organic substances only so long as they are not rendered inactive.

Catalytically active metal reagents accelerate the oxidation of the antioxidants used to stabilize organic substances subject to oxidative deterioration. Accordingly, these catalytically active metal reagents and the antioxidants are antagonistic in action and the normal inhibiting effect of the antioxidant is greatly reduced in the presence of a catalytically active metal reagent. It is, therefore, desirable to provide some method which prevents the catalytically active metal reagent from exerting its normally effect.

Amine antioxidants having the formula:

(I) 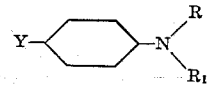

wherein R represents a hydrogen atom or an alkyl group having 1 to 5 carbon atoms, $R_1$ represents a hydrogen atom or an alkyl group having 1 to 5 carbon atoms and Y represents a hydroxy group or an

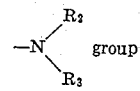  group wherein $R_2$ represents a hydrogen atom or an alkyl group having 1 to 5 carbon atoms and $R_3$ represents a hydrogen atom or an alkyl group having 1 to 5 carbon atoms have been disclosed as being useful to help preserve organic substances, such as gasoline, subject to oxidative deterioration.

N-methyl-p-aminophenol, N-dimethyl-p-aminophenol, N-ethyl-p-aminophenol, N-diethyl-p-aminophenol, N-n-propyl-p-aminophenol, N-isopropyl-p-aminophenol, N-n-butyl-p-aminophenol, N-secondarybutyl-p-aminophenol, N-n-amyl-p-aminophenol, N-isoamyl-p-aminophenol, p-aminophenol, p-phenylenediamine, p-aminodimethylaniline, p-amino-diethylaniline, p-amino-diisopropylaniline, p-amino-di-n-propylaniline, p-amino-di-n-butylaniline, p-amino-di-n-amylaniline, p-di(methylamino)-benzene, p-di(ethylamino)benzene, p-di(n-propylamino)-benzene, p-di(isopropylamino)benzene, N,N'-dimethyl-p-phenylenediamine, N,N'-diethyl-p-phenylenediamine, N,-N'-di-n-propyl-p-phenylenediamine, N,N'-diisopropyl-p-phenylenediamine, N,N'-di-n-butyl-p-phenylenediamine, N,N'-di-secondarybutyl-p-phenylenediamine, N,N'-di-n-amyl-p-phenylenediamine, N-methyl-N'-ethyl-p-phenylenediamine, N-methyl-N'-n-butyl-p-phenylenediamine and N-ethyl-N'-n-amyl-p-phenylenediamine are illustrative of the amine antioxidants having the formula designated I. Catalytically active metal reagents adversely affect the antioxidant properties of said amine antioxidants.

In an effort to combat the deleterious effect of catalytically active metal reagents substances known as "metal deactivators" are added to gasolines containing a catalytically active metal reagent. As their name implies these substances, such as N,N'-disalicylidene-1,2-propylenediamine, for example, deactivate or inhibit the catalytically active metal reagent thereby enabling the antioxidant to function at its fullest, or substantially so, efficiency. The problem of protecting gasoline, especially cracked gasoline against oxidative deterioration is complicated by the fact that an excess of metal deactivator may, in the presence of some metals, decrease the stability of the gasoline to oxidation. For example, a gasoline containing 0.0048 weight percent of p-butylaminophenol had an induction period of 545 minutes which was reduced to 360 minutes by the addition of 1.0 mg. of cobalt per liter. The further addition of 0.001 weight percent of disalicylidene-1,2-propylenediamine to the inhibited cobalt-containing gasoline decrease the induction period to 80 minutes. Accordingly, an excess of metal deactivator over that required to deactivate the catalytically active metal reagent cannot always be added to the gasoline, in order to protect it against any catalytically active metal reagent picked up subsequent to the addition of the metal deactivator. The need exists therefor for a product which can be added to gasoline containing a catalytically active metal reagent to protect it against oxidative deterioration, said product being characterized in that it acts both as an antioxidant and a metal deactivator and can be added to the gasoline in excess of the amount required to deactivate the catalytically active metal reagent present in the gasoline at the time of its addition without adversely affecting the stability of the gasoline to oxidation.

It is an object of our invention to retard the deterioration of motor fuels caused by the action of molecular oxygen and promoted by the presence of certain metal catalysts and their catalytically active compounds. Another object is to provide motor fuels of improved stability. A further object is to render antioxidants, which are relatively ineffective in the presence of metal catalysts and their catalytically active compounds, effective to inhibit the oxidation of motor fuels even in the presence of metal catalysts and their catalytically active compounds. A specific object is to retard the deterioration of gasoline caused by the action of molecular oxygen and promoted by the presence of certain metal catalysts and their catalytically active compounds. Another object of our invention is to provide an improved method of deactivating catalytically active metal reagents present in motor fuels such as gasoline.

We have discovered that compositions comprising a citric acid or a tartaric acid salt of an amine antioxidant having the formula designated I and an amine antioxidant having the formula designated I confer high stability to oxidative deterioration of motor fuels, particularly gasolines, either in the presence or absence of a catalytically active metal reagent. The aforesaid composition, as shown hereinafter, exerts a synergistic effect on gasolines even in the absence of a catalytically active metal reagent inasmuch as a given weight of the composition exerts a greater antioxidant effect than the same weight of the salt of the amine antioxidant or the amine antioxidant alone. This synergistic effect is unexpected and could not have been predicted inasmuch as citric acid, when added to a copper-free cracked gasoline containing N-n-butyl-p-aminophenol as an antioxidant was found to reduce the oxidative stability of the inhibited gasoline.

The ratio of the amine antioxidant salt to the amine antioxidant may vary over a wide range. Ordinarily the antioxidant composition contains about 1 to about 25 weight percent of the amine antioxidant salt, the remainder of the antioxidant composition being the amine antioxidant or essentially only the amine antioxidant. Antioxidant compositions wherein the amine antioxidant salt is present in about 10 to about 20 weight percent are preferred as they appear to have optimum potency both as a metal deactivator and antioxidant as well as having the most desirable physical properties.

About 0.001% to about 0.05% by weight of our antioxidant compositions is added to the motor fuel. Higher and lower concentrations of our antioxidant compositions can also be employed depending upon the particular circumstances involved. The amount added will vary depending on whether the motor fuel contains a catalytically active metal reagent or not and if, as is usually the case, the motor fuel contains a catalytically active metal reagent, the amount of the antioxidant compound added will vary depending on the concentration of the catalytically active metal reagent which exists in the motor fuel. The antioxidant compositions of our invention are especially of value in connection with motor fuels containing a catalytically active metal reagent. The antioxidant compositions of our invention possess an advantage over the known deactivator N,N'-disalicylidene-1,2-propylenediamine in that they will protect against catalytic metals other than copper, such as cobalt, iron and manganese, for example.

The antioxidant compositions of our invention may be prepared by adding citric acid or tartaric acid to an amine antioxidant having the formula designated I either in the presence or absence of an added inert solvent such as isopropyl alcohol, n-butyl alcohol, ethyl alcohol or toluene, for example. Usually slight heating is employed to facilitate the formation of the salt. The amount of citric acid or tartaric acid added is that which gives an antioxidant product having the composition indicated hereinbefore.

N-n-butyl-p-aminophenol citrate, N,N'-di-sec-butyl-p-phenylenediamine citrate, N-dimethyl-p-aminophenol citrate, N-ethyl-p-aminophenol citrate, N-isopropyl-p-aminophenol citrate, N-n-amyl-p-aminophenol citrate, p-amino-dimethylaniline citrate, p-amino-diethylaniline citrate, p-amino-di-n-butylaniline citrate, p-amino-di-n-amylaniline citrate, p-di(methylamino)benzene citrate, p-di(isopropylamino)benzene citrate, N,N'-dimethyl-p-phenylenediamine citrate, N,N'-di-sec-butyl-p-phenylenediamine citrate, N - methyl - N' - n - butyl - p - phenylenediamine citrate, N-n-butyl-p-aminophenol tartrate, N,N'-di-sec-butyl-p-phenylenediamine tartrate, N-dimethyl-p-aminophenol tartrate, N-ethyl-p-aminophenol tartrate, N-isopropyl-p-aminophenol tartrate, N-n-amyl-p-aminophenol tartrate, p - amino - dimethylaniline tartrate, p - amino-diethylaniline tartrate, p-amino-di-n-butylaniline tartrate, p-amino-di-n-amylaniline tartrate, p-di(methylamino)-benzene tartrate, p-di(isopropylamino)benzene tartrate, N,N'-dimethyl-p-phenylenediamine tartrate, N,N'-di-sec-butyl-p-phenylenediamine tartrate and N-methyl-N'-n-butyl-p-phenylenediamine tartrate are illustrative of the amine antioxidant salts present in the antioxidant compositions of our invention.

Any citrate or tartrate salt of the amine antioxidants having the formula designated I, such as those just named, can be added to any of the amine antioxidants having the formula designated I to form antioxidant compounds of our invention. Thus, N-n-butyl-p-aminophenol citrate, N,N'-di-sec-butyl-p-phenylenediamine citrate, N-n-butyl-p-aminophenol tartrate and N,N'-di-sec-butyl-p-phenylenediamine tartrate, for example, can be added to N-n-butyl-p-aminophenol, N,N'-di-sec-butyl-p-phenylenediamine, N-diethyl-p-aminophenol, p-phenylenediamine, p-amino-diethylaniline and N,N'-di-sec-butyl-p-phenylenediamine or any other amine antioxidant having the formula designated I to form antioxidant compositions of our invention. The proportions of the amine antioxidant salt to be added to the amine antioxidant have been indicated hereinbefore.

The efficiency of the antioxidant compositions of our invention both as antioxidants and as deactivators for catalytically active metal reagents was demonstrated by oxygen bomb stability tests on a Pennsylvania cracked gasoline to which our antioxidant compositions were added in the presence and absence of copper. This cracked gasoline which was employed in the examples given hereinafter had an induction period of 65 minutes. The copper was added in the form of cupric oleate to give a concentration of 1.0 mg. of copper per liter in the gasoline. The oxygen bomb stability test used to determine the induction periods of the various samples is that described in Industrial and Engineering Chemistry (Ind. Ed.), vol. 24, page 1375 (1932).

EXAMPLE 1

This example illustrates the harmful effects of copper on the oxidation stability of gasoline inhibited with the well-known antioxidant N-n-butyl-p-aminophenol. A sample of gasoline containing 0.0048 weight percent of this antioxidant had an induction period of 730 minutes. However, upon addition of 1.0 mg. of copper per liter to this inhibited gasoline, the induction period was reduced to 170 minutes, indicating almost complete loss of the inhibiting value of the antioxidant.

EXAMPLE 2

A sample of the uninhibited cracked gasoline was treated with 0.0048 weight percent of a partially citrated N-n-butyl-p-aminophenol, consisting of 9 weight percent N-n-butyl-p-aminophenol citrate and 91 weight percent N-n-butyl-p-aminophenol. In the absence of copper the gasoline so treated had an induction period of 735 minutes while the same treated gasoline to which 1.0 mg. of copper per liter had been added had an induction period of 685 minutes. By a comparison with Example 1 it is seen that the partially citrated N-n-butyl-p-aminophenol was more effective than N-n-butyl-p-aminophenol alone in the absence of copper and much superior to N-n-butyl-p-aminophenol alone in the presence of copper.

EXAMPLE 3

This example shows the catalytic effect of copper on the antioxidant N,N'-di-sec-butyl-p-phenylenediamine. In the absence of copper a sample of the gasoline containing 0.01 weight percent of this antioxidant had an induction period of 695 minutes. Upon the addition of 1.0 mg. of copper per liter to this inhibited gasoline the induction period was reduced to 155 minutes, indicating almost complete loss of the inhibiting value of the antioxidant.

EXAMPLE 4

A sample of the uninhibited gasoline was treated with 0.01 weight percent of an antioxidant of our invention consisting of 19 weight percent N,N'-di-sec-butyl-p-phenylenediamine citrate and 91 weight percent N,N'-di-sec-butyl-p-phenylenediamine. In the absence of copper this treated gasoline had an induction period of 690 minutes while in the presence of 1.0 mg. of copper per liter the induction period was 615 minutes. This shows that copper has little effect upon the inhibiting value of our antioxidant composition.

For ready comparison the results obtained employing the antioxidant compositions of our invention are shown in Table 1.

EXAMPLE 5

This example shows that tartaric acid may be used in preparing our antioxidant composition. A sample of gasoline, when inhibited with 0.01 weight percent of N,N'-di-sec-butyl-p-phenylenediamine, had an induction period of 715 minutes which was reduced to 150 minutes in the presence of 1.0 mg. of copper per liter. The same gasoline, when inhibited with 0.01 weight percent of an antioxidant of our invention consisting of 10 weight percent of N,N'-di-sec-butyl-p-phenylenediamine tartrate and 90 weight percent of N,N'-di-sec-butyl-p-phenylenediamine, had an induction period of 600 minutes in the absence of copper and an induction period of 600 minutes in the presence of 1.0 mg. of copper per liter. This shows that copper has no effect on the inhibiting value of our antioxidant composition.

EXAMPLE 6

This example shows that our new antioxidant composition is effective in the presence of cobalt. A sample of gasoline, when inhibited with 0.01 weight percent of N,N'-di-sec-butyl-p-phenylenediamine, had an induction period of 745 minutes which was reduced to 442 minutes in the presence of 1.0 mg. of cobalt per liter. The same gasoline, when inhibited with 0.01 weight percent of an antioxidant of our invention consisting of 10 weight percent of N,N'-di-sec-butyl-p-phenylenediamine citrate and 90 weight percent N,N'-di-sec-butyl-p-phenylenediamine, had an induction period of 672 minutes in the absence of cobalt and an induction period of 687 minutes in the presence of 1.0 mg. of cobalt per liter.

EXAMPLE 7

This example shows that our new antioxidant is effective in the presence of manganese. A sample of gasoline, when inhibited with 0.01 weight percent of N,N'-di-sec-butyl-p-phenylenediamine, had an induction period of 745 minutes which was decreased to 515 minutes in the presence of 1.0 mg. of manganese per liter. The same gasoline, when inhibited with 0.01 weight percent of an antioxidant of our invention consisting of 10 weight percent of N,N'-di-sec-butyl-p-phenylenediamine citrate and 90 weight percent N,N'-di-sec-butyl-p-phenylenediamine, had an induction period of 655 minutes in the absence of manganese and an induction period of 707 minutes in the presence of 1.0 mg. of manganese per liter.

*Table 1*

| Test No. | Antioxidant Composition, Wt. Percent | Antioxidant Conc. in Gasoline, Wt. Percent | Induction Period by Oxygen Bomb Stability Test, Minutes | |
|---|---|---|---|---|
| | | | No copper Present in Gasoline | 1.0 Mg. Cu/Liter Present in Gasoline |
| 1 | None (blank on gasoline) | None | 65 | 40 |
| 2 | N-n-Butyl-p-aminophenol | 0.0048 | 730 | 170 |
| 3 | 9% N-n-Butyl-p-aminophenol citrate, 91% N-n-Butyl-p-aminophenol. | 0.0048 | 735 | 685 |
| 4 | N-n-Butyl-p-aminophenol citrate. | 0.0048 | 375 | 367 |
| 5 | N,N'-Di-sec-butyl-p-phenylene-diamine. | 0.01 | 695 | 155 |
| 6 | 19% N,N'-Di-sec-butyl-p-phenylenediamine citrate, 81% N,N'-Di-sec-butyl-p-phenylenediamine. | 0.01 | 690 | 615 |
| 7 | N,N'-Di-sec-butyl-p-phenylene diamine citrate. | 0.01 | 410 | 385 |

In order that our invention may be clearly understood, the formulas for a few representative amine antioxidant salts present in the antioxidant compositions of our invention are given hereinafter:

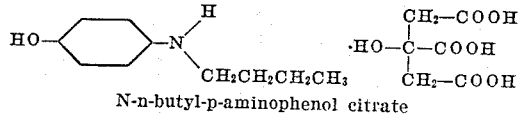

N-n-butyl-p-aminophenol citrate

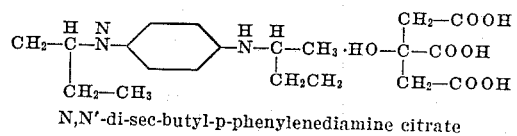

N,N'-di-sec-butyl-p-phenylenediamine citrate

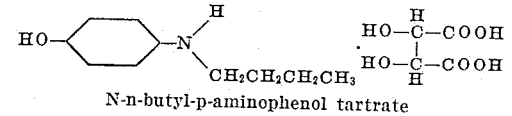

N-n-butyl-p-aminophenol tartrate

The expression of "catalytically active metal reagent" as used in the specification and claims refers to catalytically active metals as well as their catalytically active compounds.

We claim:

1. A motor fuel stable to oxidation, consisting essentially of gasoline normally subject to deterioration caused by the action of molecular oxygen, and, in quantity sufficient to inhibit such deterioration, a stabilizing composition consisting essentially of about 1% to about 25% by weight of a salt selected from the group consisting of a citrate salt and a tartrate salt of an amine antioxidant having the formula:

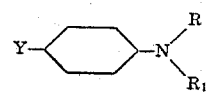

wherein R represents a member selected from the group consisting of a hydrogen atom and normal and secondary butyl groups, $R_1$ represents a member selected from the group consisting of a hydrogen atom and normal and secondary butyl groups, Y represents a member selected from the group consisting of a hydroxy group and an

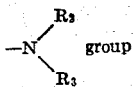 group wherein $R_2$ represents a member selected from the group consisting of a hydrogen atom and normal and secondary butyl groups and $R_3$ represents a member selected from the group consisting of a hydrogen atom and normal and secondary butyl groups and about 75% to about 99% by weight of an amine antioxidant having the formula:

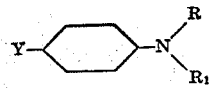

wherein R, $R_1$ and Y have the meaning just assigned to them.

2. A motor fuel stable to oxidation, consisting essentially of gasoline normally subject to deterioration caused by the action of molecular oxygen, and, in quantity sufficient to inhibit such deterioration a stabilizing composition consisting essentially of about 10 to about 20 weight percent of N-n-butyl-p-aminophenol citrate and about 80 to about 90 weight percent of N-n-butyl-p-aminophenol.

3. A motor fuel stable to oxidation, consisting essentially of gasoline normally subject to deterioration caused by the action of molecular oxygen, and, in quantity sufficient to inhibit such deterioration a stabilizing composition consisting essentially of about 10 to about 20 weight percent of N,N'-di-secondarybutyl-p-phenylenediamine citrate and about 80 to about 90 weight percent of N,N'-di-secondarybutyl-p-phenylenediamine.

4. A motor fuel stable to oxidation, consisting essentially of gasoline normally subject to deterioration caused by the action of molecular oxygen, and, in quantity sufficient to inhibit such deterioration, a stabilizing composition consisting essentially of about 9.0 weight percent of N-n-butyl-p-aminophenol citrate and about 91.0 weight percent of N-n-butyl-p-aminophenol.

5. A motor fuel stable to oxidation, consisting essentially of gasoline normally subject to deterioration caused by the action of molecular oxygen and, in quantity sufficient to inhibit such deterioration a stabilizing composition consisting essentially of about 19.0 weight percent of N,N'-di-secondarybutyl-p-phenylenediamine citrate and about 81.0 weight percent of N,N'-di-secondarybutyl-p-phenylenediamine.

References Cited in the file of this patent
UNITED STATES PATENTS

| | | |
|---|---|---|
| 2,086,867 | Hall | July 13, 1937 |
| 2,120,244 | Dryer | June 14, 1938 |
| 2,498,630 | Thompson | Feb. 28, 1950 |
| 2,584,784 | Biswell | Feb. 5, 1952 |
| 2,633,425 | Thompson | Mar. 21, 1953 |
| 2,700,612 | Chenicek | Jan. 25, 1955 |
| 2,747,979 | Thompson | May 29, 1956 |
| 2,768,885 | Kalinowski et al. | Oct. 30, 1956 |

UNITED STATES PATENT OFFICE
Certificate of Correction

Patent No. 2,865,723 December 23, 1958

Gerald R. Lappin et al.

It is hereby certified that error appears in the printed specification of the above numbered patent requiring correction and that the said Letters Patent should read as corrected below.

Column 2, line 8, after "normally" insert —harmful—; column 6, lines 44 to 47, the formula should appear as shown below instead of as in the patent:

same column 6, line 55, after "expression" strike out "of".

Signed and sealed this 21st day of April 1959.

[SEAL]

Attest:
KARL H. AXLINE,
*Attesting Officer.*

ROBERT C. WATSON,
*Commissioner of Patents.*